United States Patent [19]

Bergman

[11] Patent Number: 5,326,587
[45] Date of Patent: Jul. 5, 1994

[54] METHOD OF DEPOSITING A LIQUID
[75] Inventor: Norman J. Bergman, Danbury, Conn.
[73] Assignee: Pitney Bowes Inc., Stamford, Conn.
[21] Appl. No.: 867,636
[22] Filed: Apr. 13, 1992

Related U.S. Application Data

[62] Division of Ser. No. 481,545, Feb. 20, 1990, Pat. No. 5,145,709.
[51] Int. Cl.[5] .............................................. B05D 5/10
[52] U.S. Cl. ..................................... 427/8; 427/207.1; 427/336; 427/439; 427/444
[58] Field of Search ................ 427/8, 439, 207.1, 336, 427/444

*Primary Examiner*—Bernard Pianalto
*Attorney, Agent, or Firm*—Charles G. Parks, Jr.; Melvin J. Scolnick

[57] ABSTRACT

The invention disclosed herein provides for automatically controlling positioning of a moistening nozzle relative to an envelope flap being moved therepast at high speed. The invention has particular application as an envelope flap moistener in a high speed mailing machine. Envelopes are moved to and past the nozzle at a speed of at least about 65 inches per second along a given path with the flap extending from the envelope in an opened configuration thereof. A sensor attached to the nozzle senses the location of the edge of the flap within about 0.2 inch of the nozzle upstream thereof a plurality times as the flap moves to and past the nozzle. The nozzle is then positioned to track the flap edge in accordance with sensing of the envelope flap. The nozzle may be pre-positioned by a lower bandwidth servo system having an envelope sensor located further upstream of the tracking sensor. A higher bandwidth servo loop controls tracking of the nozzle in response to the tracking sensor. It is not necessary to use stored or computed envelope flap profiles, envelope speed, etc., for the nozzle to track the envelope flap.

4 Claims, 8 Drawing Sheets

METHOD OF DEPOSITING A LIQUID

This application is a divisional application of Ser. No. 07/481,545, Feb. 20, 1990 now U.S. Pat. No., 5,145,709.

BACKGROUND OF THE INVENTION

This invention relates generally to applying liquid to a region of an object such as the flap of an envelope or the like, in which relative movement brings the object and a liquid applicator adjacent each other. More particularly, the invention relates to controlling the position of a liquid applicator outlet for rapid application of liquid to envelope flaps moved at high speed past the liquid applicator outlet. The invention has particular application to a method of moistening of gummed envelope flaps in a mailing machine by a method for positioning a liquid outlet of a liquid application for applying liquid to an envelope flap being moved to and past the liquid outlet along a given path with the flap extending from the envelope in an opened configuration.

U.S. Pat. No. 3,911,862 discloses a moistening system for envelope flaps.

Co-pending U.S. patent application Ser. Nos. 291,461 and 291,844, both filed on Dec. 28, 1988, disclose the high speed moistening of envelope flaps in which the edge of the envelope flap is sensed a given distance upstream of a spray nozzle, the velocity of the envelope is determined, and movement of the nozzle is controlled as a function of the given distance, the sensed flap edge and the envelope velocity. The inventor and assignee in both of those applications are the same as herein, and the disclosures of those two applications are incorporated herein by reference.

SUMMARY OF THE INVENTION

It is an object of the present invention to improve, simplify and/or facilitate the automatic application of liquid to a desired region of an object.

It is another object of the present invention to improve, simplify and/or facilitate automatic moistening of a desired region of a surface, e.g., moistening with water the gummed portion of an envelope flap.

It is another object of the present invention to achieve the above objects of the invention at high speed.

It is another object of the present invention to improve, simplify and/or facilitate high speed moistening of gummed envelope flaps in a high speed mailing machine.

The above and other objects are achieved in accordance with the invention disclosed herein which provides for automatically controlling relative positioning between a region of an object to which liquid is to be applied and a liquid applicator outlet which are being moved relative to each other to bring them adjacent each other. The region and the outlet are moved relative to each other, e.g., the region is moved to and past the outlet, the region is sensed a short distance before the region and the outlet are adjacent each other, and the region and the applicator outlet are relatively positioned to track as the region and outlet are relatively moved past each other. The short distance, the relative speed between the region and the outlet, and the sampling rate at which the region is sensed are such that errors in applying liquid to the region resulting from relative movement (e.g., slippage, speed changes, skewing, etc.) are substantially reduced. Preferably, the distance between the region and the outlet when sensing takes place is as short as possible without imposing under constraints and/or requirements on other system parameters and/or functions.

Preferably, the outlet and region are relatively prepositioned before the region is sensed for the tracking described above.

In accordance an embodiment of the invention, liquid is automatically applied from the outlet of a liquid applicator to a region of a mail piece. The mail piece region varies with respect to a given path of motion such that some type of tracking is required to apply liquid from the liquid applicator to the region. The applicator outlet and the mail piece region are moved relative to each other towards each other along the path. The mail piece region is sensed at a selected sampling rate a short distance before the region and the outlet are adjacent each other. The mail piece region and the applicator outlet are positioned relative to each other to track as the region and the outlet are relatively moved past each other along the path. The short distance and the sampling rate are selected to substantially eliminate errors in applying liquid to the region at the selected speed resulting from movement errors such as slippage, skewing, speed changes, etc. The invention has particular application to high speed mail processing where mail pieces are moved through processing apparatus at relatively high speeds, e.g., about 65 inches per second and faster.

In a preferred embodiment, the region is the gummed portion of an envelope flap, the liquid is water and the envelope is moved towards the liquid applicator outlet; the flap is sensed the short distance upstream of the outlet; and the outlet is positioned to track the flap as the flap is moved past the outlet. Preferably, the prepositioning referred to above is accomplished by sensing the flap a first time further upstream of the outlet, and in response thereto pre-positioning the outlet before the flap is sensed a second time the short distance upstream of the outlet.

While the invention has particular application as an envelope flap moistener in a high speed mailing machine, the invention is not limited to moistening the flaps of envelopes. However, for simplicity and clarity, further description of the invention will be made with respect to applying water to envelope flaps.

In one embodiment, envelopes are moved to and past the liquid outlet at a speed of from about 65 inches per second to about 110 inches per second along a given path with the flap extending from the envelope in an opened configuration thereof. The short distance upstream of the liquid applicator outlet at which flap edge sensing takes place is selected to be as close as possible to the outlet, without imposing undue constraints or requirements on system parameters and functions such as envelope speed, response time of the means for moving the nozzle, mounting of the sensor means in close proximity to the liquid outlet, degree of accuracy of liquid application, component cost, etc. Taking the foregoing system parameters and functions into consideration, in a high speed system where mail is moved at speeds of about 65 inches per second to about 110 inches per second, the leading edge of the flap is sensed within about 0.1 inch to about 0.2 inch of the liquid outlet upstream thereof a plurality times as the flap moves to and past the liquid outlet, and the liquid outlet is positioned by the moving means to track in accordance with sensing of the envelope flap edge.

In another embodiment, the sensing means are attached to the liquid applicator outlet on an upstream side thereof relative to the path so that the sensing means and the outlet may be moved together; the edge of the flap is sensed relative to a reference of the sensing means which is fixed with respect to the sensing means; and the liquid applicator outlet is positioned by the moving means to track the flap edge in accordance with the sensing of the flap edge.

In accordance with another embodiment, an edge of the envelope flap is sensed at a first location of the path upstream of the outlet; the liquid applicator outlet is moved to a first position in accordance with sensing of the flap edge at the first location; the flap edge is sensed at a second location which is adjacent the liquid outlet upstream thereof and downstream of the first location relative to the path; and the liquid outlet is moved from the first position to maintain the liquid outlet adjacent the flap edge in accordance with sensing of the flap edge at the second location.

In accordance with another embodiment of the invention, liquid is applied to flaps of envelopes by: moving the envelopes along a given path past a first location upstream of the outlet and a second location adjacent the outlet, upstream thereof and downstream of the first location with the flaps of respective envelopes extending in an opened configuration of the envelopes; determining the position of an edge of an envelope flap with respect to the path transversely thereof at the first location; moving the liquid outlet to a first position with respect to the path transversely thereof in accordance with the determined position of the flap edge at the first location; determining the position of the flap edge with respect to the path transversely thereof at the second location; moving the liquid outlet from the first position to maintain the liquid outlet adjacent the flap edge in accordance with the determined position of the flap edge at the second location; and applying liquid from the outlet to the flap while the outlet is adjacent the edge of the flap.

In the preferred embodiment, the second location referred to above is disposed the short distance (described above) upstream of the liquid applicator outlet.

An embodiment of a system in accordance with the invention for automatically applying liquid from the outlet of a liquid applicator to an envelope flap which varies with respect to a given path of motion, comprises: first moving means for relatively moving the applicator outlet and the envelope towards each other along the path at a selected speed, preferably greater than about 65 inches per second; sensing means for sensing the envelope flap at a selected sampling rate the short distance (described above) before the flap and the outlet are adjacent each other; second moving means for relatively moving the envelope and the applicator outlet relative to each other transversely of the path; control means responsive to the sensing means for controlling the second moving means to cause tracking of the outlet and the flap edge as the flap and the outlet are relatively moved past each other along the path. The short distance and the sampling rate are selected to substantially eliminate errors in applying liquid to the region at the selected speed resulting from movement between the envelope and the liquid applicator output. Preferably, this embodiment includes first sensing means for sensing an envelope flap at a first location upstream of second sensing means at a second location disposed the short distance upstream of the outlet, and the control means in response to the first sensing means causes the second moving means to preposition the liquid applicator outlet, and in response to the second sensing means causes tracking of the outlet and flap edge.

Thus, an embodiment of the invention preferably includes means as described above for pre-positioning the liquid applicator outlet before the envelope reaches the sensing means disposed the short distance upstream of the applicator.

The second sensing means disposed the short distance upstream of the liquid applicator outlet, in a preferred embodiment is attached to move with the outlet and provides signals defining an edge position of the flap with respect to a reference position of the outlet, and the control means in response to the signals causes the moving means (e.g., a d.c. motor) to move the reference position of the liquid applicator outlet to the flap edge position.

The tracking sensing means preferably comprises a linear array disposed to lie transversely to the envelope travel path, the array having a center generally aligned with the edge of the outlet which defines the reference. The array may provide binary level signals coded to define the flap edge position relative to the reference, and the control means may comprises a decoder which receives the binary level signals and provides output signals coupled to the moving means for causing the moving means to move the liquid outlet until the reference position thereof is adjacent the envelope flap edge.

According to an embodiment, the control means includes two closed loop servos which control a d.c. motor. One servo loop controls the motor to pre-position the liquid applicator outlet, as described above. That loop need not have a particularly high bandwidth, i.e., it need not have relatively high sampling rates. The pre-positioning servo loop may be implemented in large part by a microcomputer, or a programmed controller, which may also service other parts of a mailing system. The other servo loop which causes the liquid applicator outlet to track an envelope flap requires a higher bandwidth due to the closeness thereto of its sensing means. This second servo loop need not be implemented by a programmed controller whose bandwidth and speed are dependent upon program execution and sampling. Instead, the tracking servo loop may be implemented with analog compensation.

The invention simplifies control of the liquid applicator and/or envelope feed, and reduces it to a closed loop servo control. It is not necessary to use a stored envelope flap profile, envelope speed, etc., to compute the relative position of the envelope flap edge and the liquid applicator outlet, although envelope flap profiles may, but need not, be used to pre-position the outlet. Moreover, the relative closeness of the liquid applicator outlet and envelope flap when sensing takes place substantially eliminates motion errors such as envelope slippage, speed changes, skewing, etc.

BRIEF DESCRIPTION OF THE DRAWINGS

The invention is described by way of example and not limitation in the figures of the accompanying drawings in which like references denote the same or corresponding parts, and wherein.

DESCRIPTION OF THE PREFERRED EMBODIMENT

Figure 1:
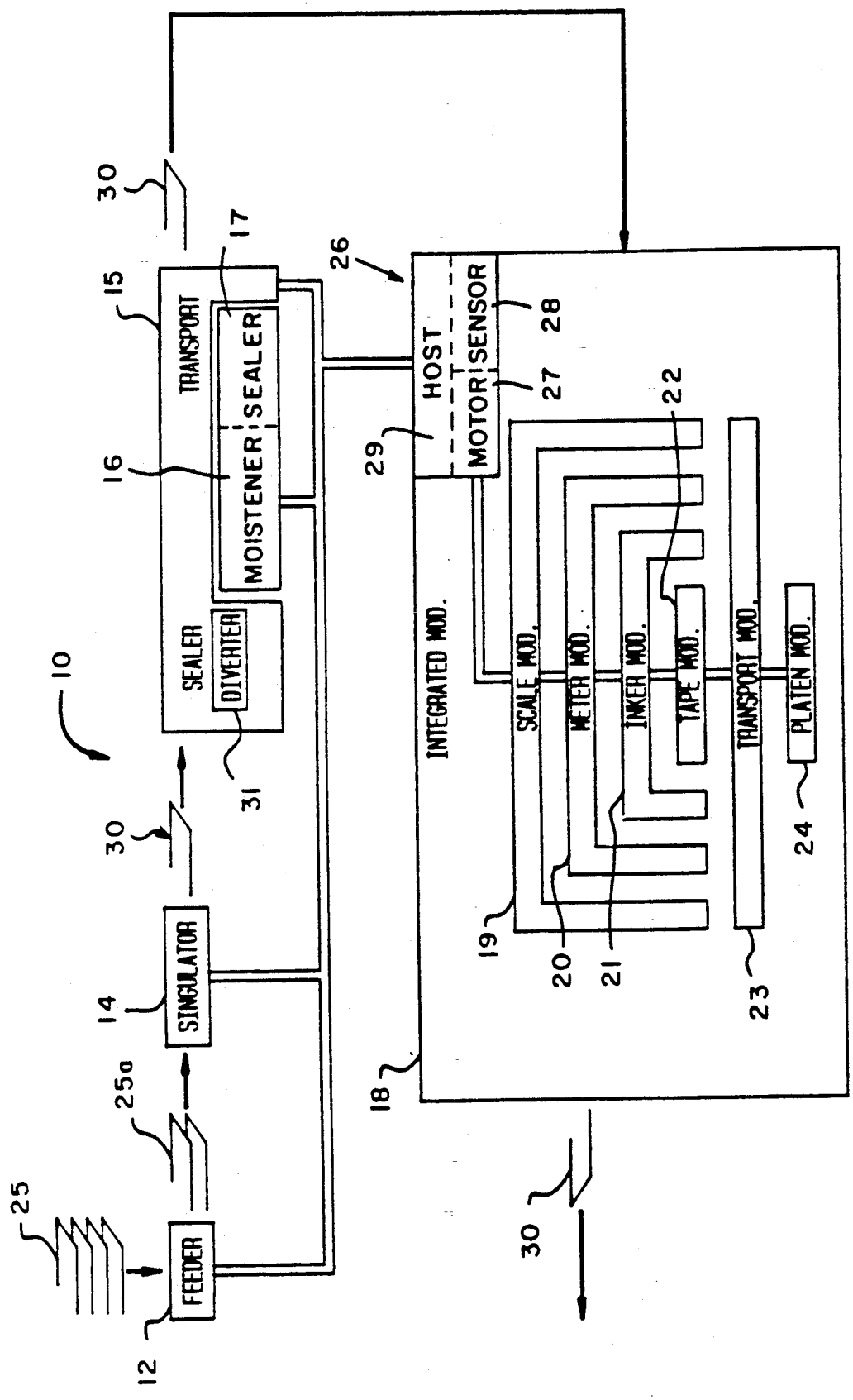
FIG. 1 is a schematic block diagram of a mailing system including a moistener incorporating the present invention.

A mail processing system (or mailing machine) 10 of the type with which the present invention may be employed is illustrated generally in FIG. 1. In order to better understand operation of the present invention, it would be helpful if a brief description of mailing machine 10 were provided. This description is based on that given in the copending application, Ser. No. 291,483. While a preferred embodiment of the present invention will be described in connection with the mailing machine described in the copending application, it will be understood that the invention is not limited in its application to that machine but can be applied to different mail-handling machines having different numbers of stations, different numbers of sensors, and operating with a different sequence of actions.

Referring not to FIG. 1, a typical mail processing system, generally indicated as 10, employing a moistener 16 according to the invention is comprised of a plurality of stations, preferably as modules. The stations or individual modules are an envelope feeder module 12, a singulator module 14 a sealer transport module 15 which includes a module comprising the moistener 16 and a sealer 17, and an integrated module 18. The integrated module 18 is comprised of a scale or weigher module 19, a meter module 20, an inker module 21, optionally a tape module 22, a transport module 23 and a platen module 24. Integrated module 18 is so referred to because the individual modules are mounted in a single housing. Each module of machine 10 includes the appropriate mechanism to perform a mail processing function. The individual modules are under control of a system controller 26, which includes a programmable microprocessor motor controller 27, a programmable microprocessor sensor controller 28 and a programmable host microprocessor 29 which provides overall supervision of motor controller 27 and sensor controller 28. Generally, the feeder module 12 receives an envelope stack 25 and, in the preferred embodiment, includes suitable mechanisms to shingle the bottom portion of the mail stack 25 into a partially shingled stack 25a. The singulator 14 is charged with the function of extracting a bottommost envelope 30 from the now partially shingled envelope stack 25a in seriatim manner, and delivering the envelope 30 to the sealer transport module 15. The sealer transport module 15 is charged with the function of traversing the envelope 30 across the moistener and sealer module 16, 17. The sealer transport module 15 has the capability of determining the sealing state of the envelope 30, and includes a diverter arm 31 for stripping flaps of envelopes open which are closed but unsealed, for responding to the seal state of an envelope such that only unsealed envelopes 30 are subject to sealing by moistening and the sealer module 16, 17, and for detecting mis-sealed envelopes. The sealer transport module 15 serves up the envelope 30 to the transport module 23 of the integrated module 18.

The transport module 23 receives the envelope 30 from the sealer transport module 15 and delivers it to the scale module 19. The scale module 19 is charged with the function of weighing the envelope 30 and reporting the appropriate postage value as a function of its weight to the postage meter module 20 mounted to the integrated module 18. The indicia printing method employed in the preferred mailing system is referred to in the art as flat bed indicia printing. In accordance therewith, as the envelope 30 rests upon the scale in the scale module 19, subsequent to being weighed, print elements in postage meter module 20 are set to the appropriate value as a function of envelope 30 weight. The inker module 21 is then charged with the function of inking the printing elements of the meter module 20. Subsequent to inking of the postage meter module print elements, the platen module 24 is charged with the function of bringing the envelope 30 into printing contact with the print elements of the postage meter module 20. After the envelope 30 has been imprinted by the postage meter module 20, the transport module 23 resumes control over the envelope 30 and ejects the envelope 3 from the integrated module 18.

The following copending patent applications include disclosure of mailing machine 10 with respect to moving means for moving envelopes towards moistener 16: Ser. No. 291,093, Ser. No. 291,095, Ser. No. 291,483, Ser. No. 291,099, Ser. No. 291,024, The disclosures of all of the foregoing applications are incorporated herein by reference.

Moistener 16 incorporating the present invention may be employed in systems other than mailing system 10.

Figure 2:
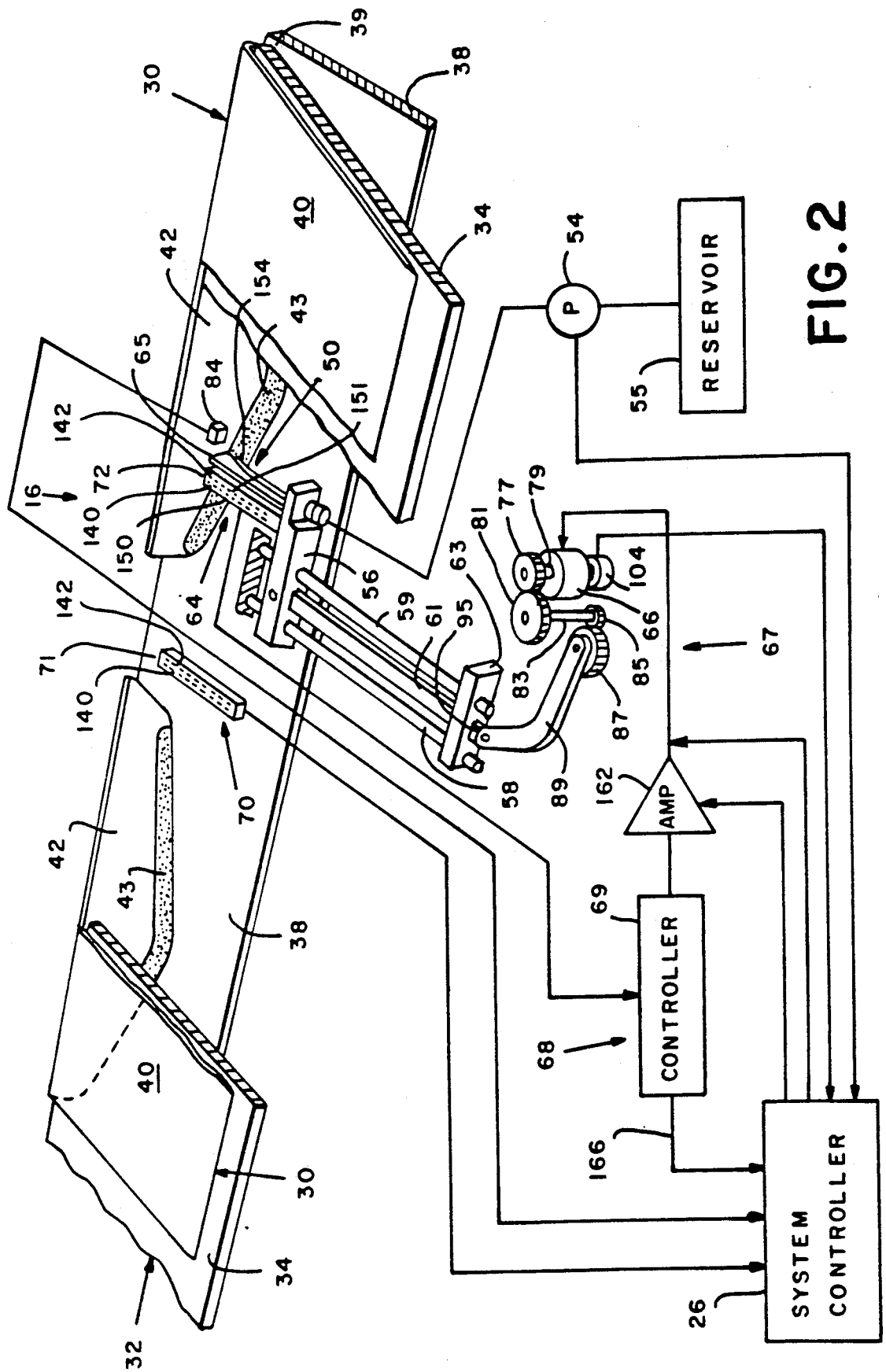
FIG. 2 is a block and schematic diagram of the moistener of the mailing system of FIG. 1.

Referring to FIG. 2, sealer transport module 15 advances envelopes 30 one at a time in an envelope guide 32 to moistener 16. Envelope guide 32 (see FIGS. 2 and 3) includes a horizontal or slightly inclined top deck 34, a lateral flap guide 38 extending downwardly at an angle to top deck 34, and a gap 39 between deck 34 and lateral guide 38. An envelope 30 is advanced in guide 32 with the body 40 of the envelope disposed flat on top of deck 34 and the envelope flap 42 extending through gap 39 and downwardly on lateral flap guide 38. The envelope includes a gummed portion 43.

Figure 9:
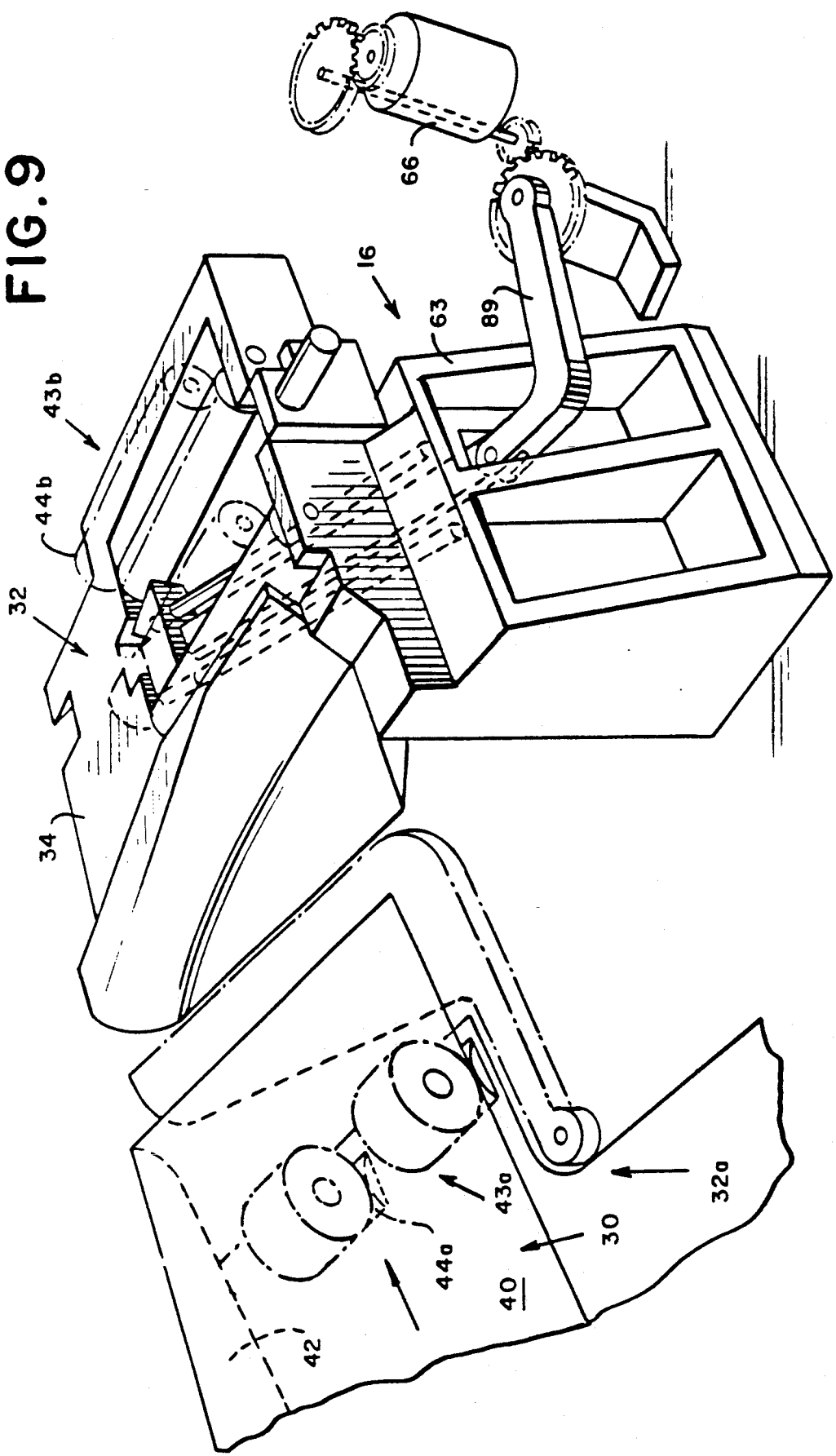
FIGS. 9 and 10 are perspective views of apparatus for stripping envelope flaps and for moving envelopes to and past the moistener.
Figure 10:
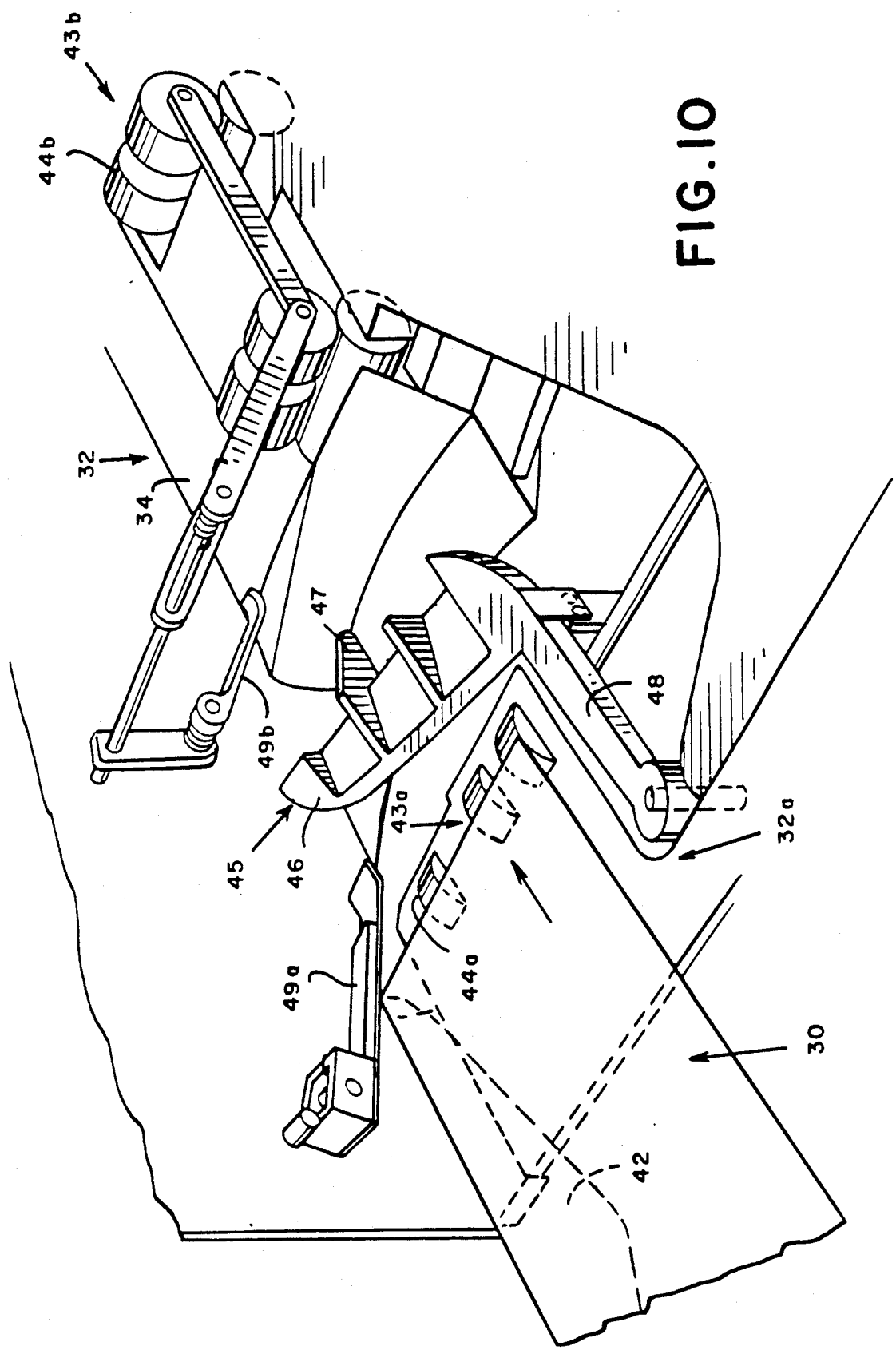

FIGS. 9 and 10 show further details of envelope guide 32 and moving means referenced generally by 43a, 43b for moving envelopes 30 to and past moistener 16. FIG. 9 shows an envelope being advanced on deck 32a towards deck 32 and moistener 16 positioned below deck 32. FIG. 10 shows apparatus for stripping open unsealed flaps 42 of envelopes 32. Envelopes 30 are transported across deck 32a by conventional transport means 43a including rollers 44a. Flap stripping takes place at blade 45 (FIG. 10). Thereafter, the envelope continues along deck 32a to moistener 16, and the envelope then proceeds downstream to sealer 17. Moistener 16 is only activated when an envelope appears whose flap is located in the slot 39. Properly sealed envelopes flow past moistener 16 without the moistener being activated.

FIG. 10 shows in greater detail the construction of apparatus for stripping open unsealed envelope flaps. Such apparatus includes blade 45, which is pivotably-mounted, is airfoil-shaped and has a wedge-like cross-section. Blade 45 has a sharp front edge, flat top sections in line with the deck 32a, which optionally may be separated by cut-out areas, and an end 46 that curves downstream. The back side of blade 45 is flat except for a downstream extension 47 which is used to support and position the blade.

Blade 45 has an upstream transverse arm extension 48 which is pivotably mounted on deck 32a. Blade 45 can be made of plastic or other material. Blade 45 is movable for performing a mis-sealed envelope function and is biased towards the closed position of FIG. 10 by a torsion spring. A biased finger 49a is mounted above deck 32a and pushes an envelope flap edge, if unsealed, down toward the deck 32a to pucker the flap from the envelope so that it may be stripped by blade 45 for moistening. A similar biased finger 49b also helps keep the envelope down against the deck 32 as it continues downstream past moistener 16 driven by the roller drive means 43b which includes rollers 44b.

Figure 3:
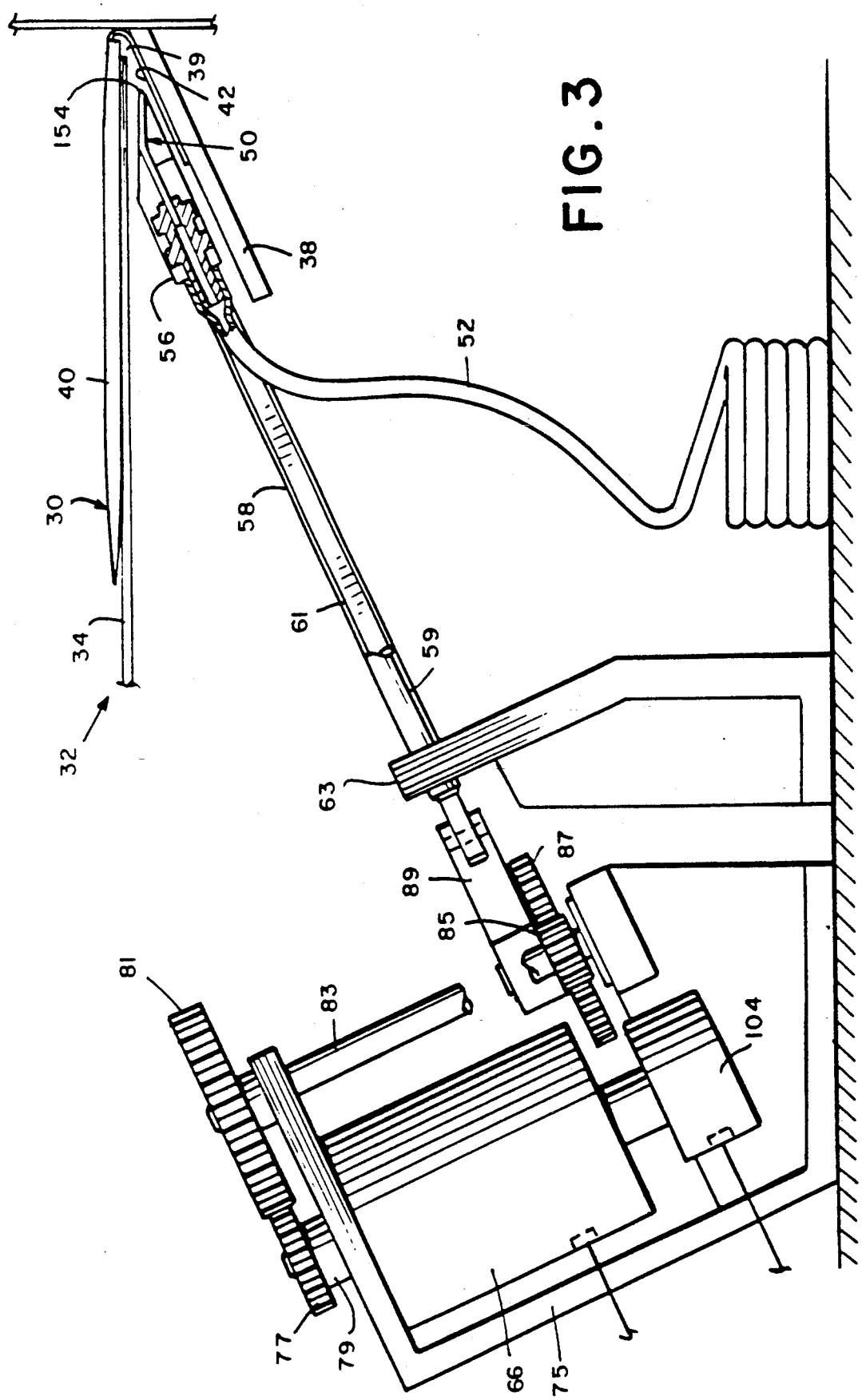
FIG. 3 is a side view of apparatus for supporting and moving the spray nozzle in the moistener depicted in FIG. 2.
Figure 4:
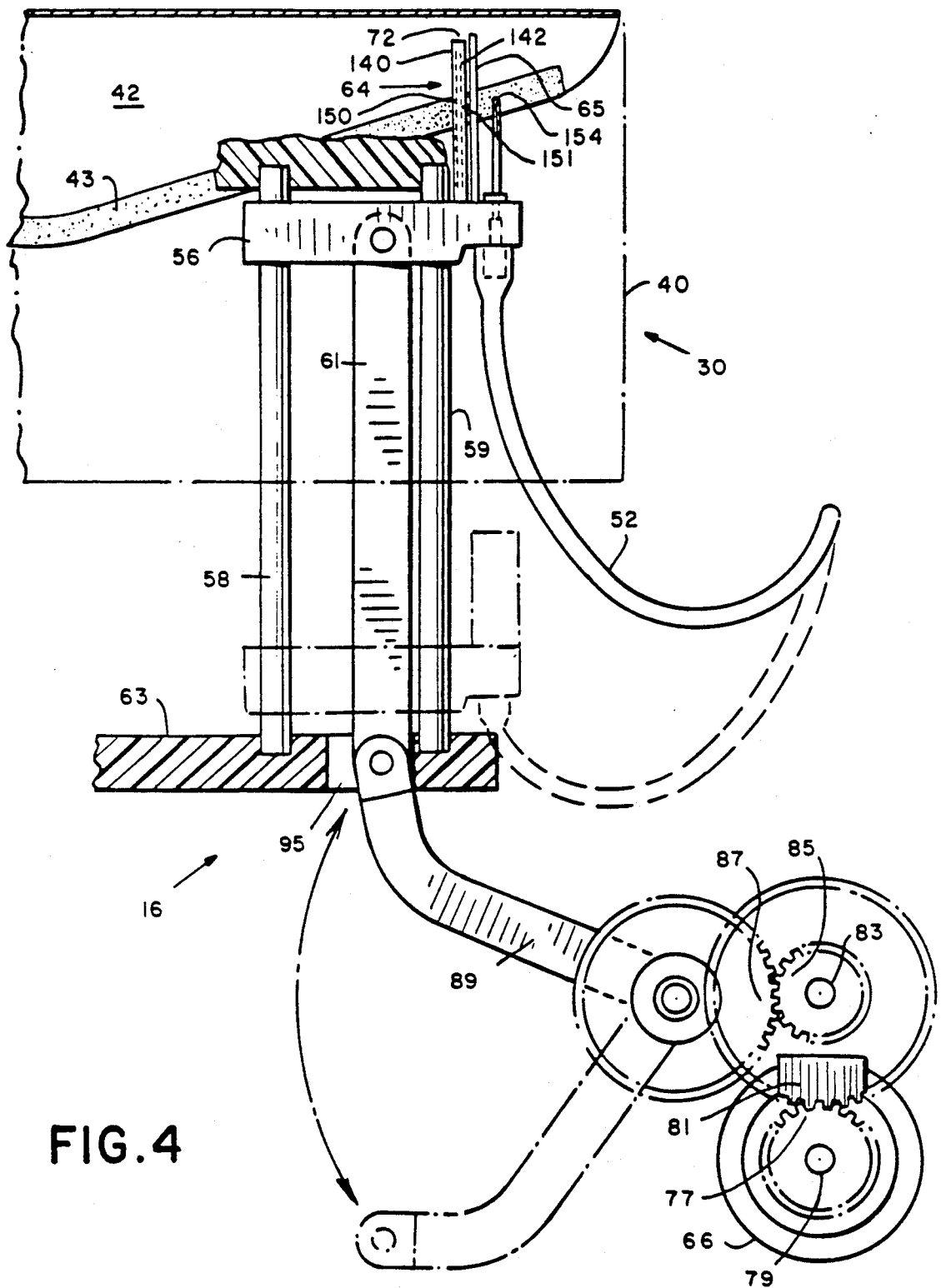
FIG. 4 is a top view of the apparatus depicted in FIG. 3.

Referring to FIGS. 2-4, moistener 16 includes a liquid outlet or nozzle 50 connected by a flexible tube 52 to a pump 54 which pumps liquid to nozzle 50 from a reservoir 55. Nozzle 50 is held on a slide 56 that is slidably mounted on a pair of fixed guide rods 58, 59 (FIG. 3). Guide rods 58, 59 extend below envelope guide 32 at an angle, for example, 25° to top deck 34. An operating link 61 between rods 58 and 59 is pivoted at on end to slide 56, and guided in a guide block 63 affixed to guide rods 58, 59 for movement parallel to the guide rods. A flap edge sensor 64 (second sensing means) for sensing the edge of an envelope flap 42 is attached to slide 56 to move with nozzle 50. Flap edge sensor 64 forms part of a servo loop controlling movement of nozzle 50, as described below. Flap edge sensor is disposed at a location (second location) a short distance upstream of and quite close to nozzle 50, e.g., 0.1 inch to 0.2 inch, as described below. A baffle 65 is therefore disposed between nozzle 50 and flap edge sensor 64 to prevent water from being sprayed on or splashing onto flap edge sensor 64.

A d.c. servo motor 66 controlled by a first, or coarse, or pre-positioning servo loop 67 (FIG. 2) including system controller 26 and a second, or fine, or tracking servo loop 68 including a controller 69 move nozzle 50 in position to spray the gummed portion of envelope flap 42. First servo loop 67 prepositions nozzle 50 based upon sensing of an envelope by another flap edge sensor 70 (first sensing means) (FIG. 2) which is at a location 71 (first location) further upstream of nozzle 50 than a second location 72 at which second flap edge sensor 64 is disposed. Second servo loop 68 then causes nozzle 50 to track, starting from a pre-positioning thereof, the edge of the envelope flap sensed just in front of nozzle 50, as described more fully below.

First flap edge sensor 70 indicates the approximate height of a flap. First servo loop 67 then pre-positions nozzle 50 for the particular flap to be moistened. Pre-positioning takes place during the envelope gap time, i.e. the time corresponding to the distance between the leading edge of the downstream envelope and the trailing edge of the adjacent upstream envelope with the envelopes traveling at a given speed. Pre-positioning during envelope gap time limits the distance upstream of nozzle 50 that first flap edge detector 70 may be place to approximately the length of the shortest envelope to be processed. Although shown to be in moistener 16, first location 71 may be disposed in sealer transport module 15 at a point therein after the envelope flap has been opened. The particular distance first location 71 is upstream from nozzle 50 (or sensor 64) may vary depending on envelope speed, servo system bandwidth, mechanical considerations, etc., but is preferably reasonably close to nozzle 50, e.g. in the order of about 3 inches to about 3.5 inches upstream thereof. First servo loop 67 also causes nozzle 50 to be pre-positioned at a default location during inter-envelope time periods, e.g., when an envelope has not yet entered moistener 16.

While it is possible to operate moistener 16 only with second positioning servo loop 68, both first loop 67 and second loop 68 are preferred to reduce bandwidth requirements, and/or to position the second flap edge sensor 64 as close as possible to nozzle 50, and/or to operate at higher envelope speeds.

Referring to FIG. 3, which for clarity does not show second sensor 64 and baffle 65, motor 66 mounted on fixed frame 75 has a pinion 77 (FIG. 3) on its shaft 79 coupled to a gear 81 on a shaft 83 mounted for rotation in frame 75. Gear 85 on shaft 83 drives a gear 87 also mounted in frame 75. Gear 87 (FIGS. 2 & 4) is affixed to link 89 for rotation therewith and is pivoted to the lower end of link 61. Guide block 63 has a slot 95 for receiving link 61, in order t o permit the necessary lateral movement of the lower end of link 61 upon rotation of link 89. As a consequence, the rotational displacement of motor shaft 79 is coupled to move slide 56 along guide rods 58, 59 between the uppermost position illustrated in FIG. 4 and a lower most position adjacent guide block 63.

As described above, envelope 30 is positioned for movement along guide 32 with its body 40 on deck 34 and its flap 42 extending through gap 39 on lateral flap guide 38. Flap 42 of envelope 30 is guided to extend in a plane parallel to the plane of guide rods 38, 39 by inclined flap guide 38. Nozzle 50 is directed to spray water downwardly against the gummed side of flap 42.

A sensor 85 senses the spray of water from nozzle 50, and system controller 26, to which sensor 85 is coupled, monitors moistening of the gummed envelope flaps.

Pump 54 pumps water from reservoir 55 to deliver water to nozzle 50 at the appropriate time, as described below.

Referring to FIG. 2, motor 66 is driven to pre-position nozzle 50 at a start location for moistening the flap of a particular envelope by the slower, coarse positioning first servo loop 67 comprised of system controller 26, first flap edge sensor 70 disposed at first location 71 upstream of nozzle 50, and actual position encoder 104 encoding the actual position of nozzle 50. After nozzle 50 is pre-positioned by first loop 67, faster, fine positioning second servo loop 68 moves nozzle 50 to track the edge of the envelope flap being moistened.

First flap edge sensor 70 and second flap edge sensor 64 are linear detectors. First flap edge sensor 70 provides a signal which when decoded gives the position of the edge of an envelope flap relative to the sensor. Second flap edge sensor provides a non-zero position feedback for second servo loop 68, except sensor, e.g., the center thereof adjacent the edge of nozzle 50, where the position error is zero. Any time that the edge of the envelope flap is not adjacent the reference of second flap edge sensor 64, a feedback signal of proper sign and magnitude is generated for second servo loop 68. Since second flap edge sensor 64 is attached to move with nozzle 50, an error signal is generated when nozzle 50 is not adjacent an edge of the envelope flap, and second servo loop 68 responds by moving nozzle 50 and second flap edge sensor 64 to align the reference on sensor 64 with the edge of the envelope flap.

The precise position of first location 71 may vary, as mentioned above, and depends upon, for example, the bandwidth of second loop 67 and the speed that envelopes 30 are advanced in moistener 16. For an envelope speed of from about 65 inches per second to about 110 inches per second, and a loop bandwidth of about 50 HZ at about a 1.5 ms sampling rate, the first location 71 of first sensor 70 may be about 3 inches to about 3.5 inches upstream of nozzle 50. Of course, the closer first location 71 is to nozzle 50, the higher the bandwidth required for a given envelope speed, since there is less time in which to properly pre-position nozzle 50 before the envelope arrives at nozzle 50. Similarly, the higher the envelope speed, the higher the bandwidth required. For an envelope speed of as high as about 110 inches per second and a first location 71 for sensor 70 of only 3.0 inches upstream of nozzle 50, first loop 67 requires the relatively low bandwidth of 50 HZ.

Second location 72 for second flap edge sensor 64 is quite close to nozzle 50, e.g., less than about 0.2 inch upstream thereof. It is highly desirable to locate second flap edge sensor 64 as close as practically possible to nozzle 50, i.e., as close as possible without imposing an undue bandwidth requirement on second servo loop 68 and without unduly complicating spraying from nozzle 50, e.g., 0.1 inch. Second loop 68 is a high bandwidth, analog compensated servo which combines a short look-ahead distance with a relatively simple sensor array and a rapid servo response to track the envelope flap profile. With second flap edge sensor 64 very close to nozzle 50, e.g., 0.1 to 0.2 inches upstream, there is essentially no servo "transport lag" between second sensing location 72 and nozzle 50 in which tracking errors may be introduced due to slippage, skewing, speed changes, etc. Such errors may cause a poor seal, and possibly cause spraying the mailing machine, inside the envelope, or both.

The precise position of second location 72 thus depends upon the bandwidth of second servo loop 68 and the speed that envelopes 30 are advanced in moistener 16. Applicant determined that a reasonable bandwidth of about 1 KHz is required for an envelope speed of as high as about 110 inches per second and a second location 72 for second flap edge sensor 64 of about 0.1 inch servo loop 68 must respond to a position command within about 1 ms. That requires the sampling period of 0.1 to 0.5 ms, which is difficult to achieve with non-dedicated, reasonable cost programmed microprocessors or microcomputers. For example, non-dedicated system controller 26 cannot achieve such performance while at the same time servicing other parts of mail system 10, and reasonable cost non-DSP (digital signal processor) processors are not fast enough, even if dedicated. Therefore, applicant concluded that servo loop 68 employ analog compensation, i.e., not under program control, to position nozzle 50 to track the edge of envelope flap 42.

On the other hand, the lower bandwidth requirement of first loop 67 enables servo loop 67 to be implemented by system controller 26 (except for actual position encoder 104 and sensor 70), as described below, without impairing the ability of system controller 26 to control and service the remainder of mailing system 10.

Figure 5:
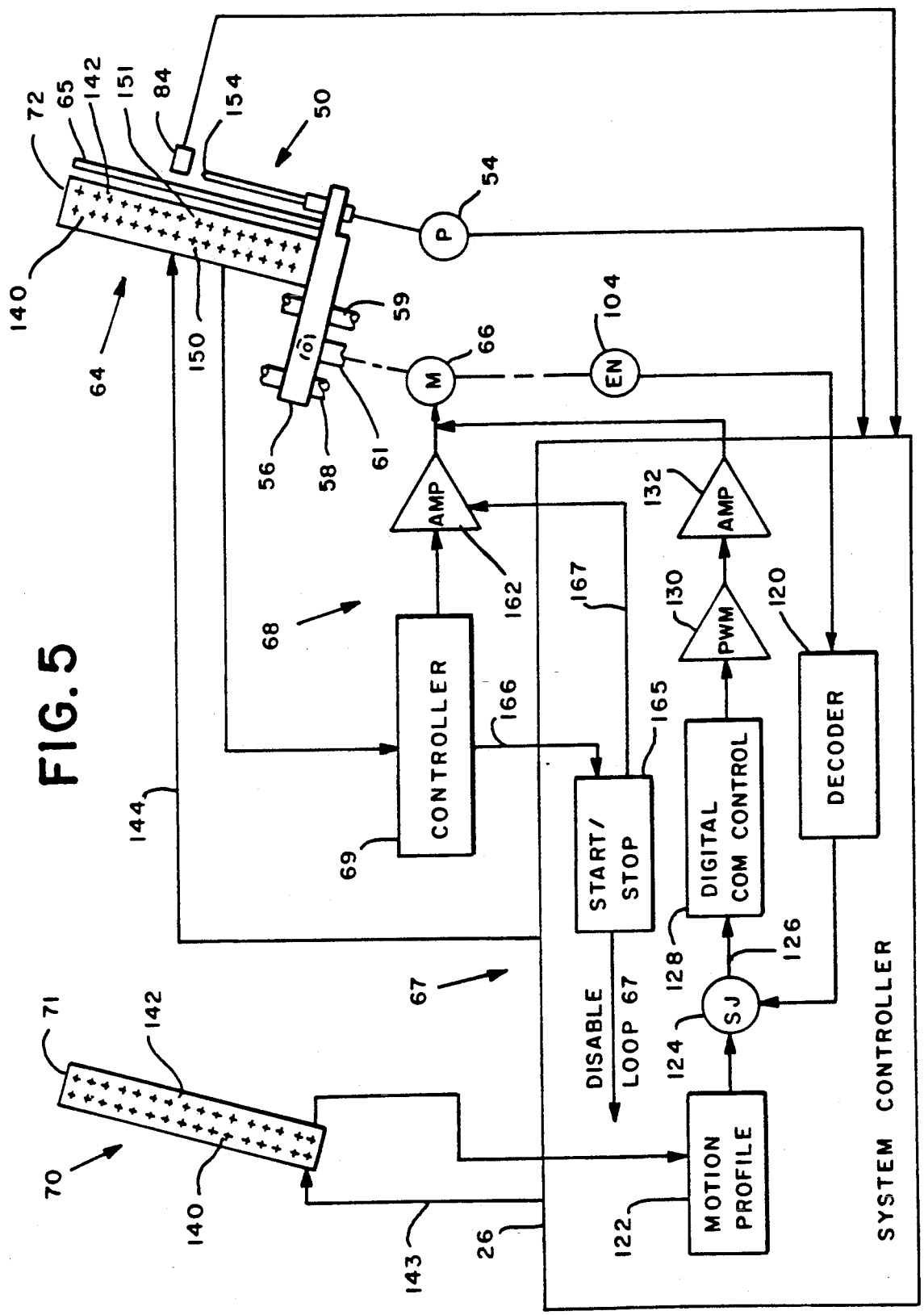
FIG. 5 is a block diagram of a control system in accordance with the invention for controlling the position of the nozzle of the moistener.

FIG. 5 depicts within block 26 representing system controller 26 a hardware model for that portion of first loop 67 implemented by system controller 26. System controller 26 implements the following functions:

decoding the signals output by actual position encoder 104, as represented by decoder 120;

generating a motion profile signal from the signals output by first flap edge sensor 70, as represented by motion profile generator 122;

summing the signals from decoder 120 and motion profile generator 122 representing, respectively, the actual and desired positions of nozzle 50, and providing an error signal, as represented by summing junction 124 and output line 126;

generating a digital compensation signal from the error signal output on line 126, as represented by a digital compensation control 128;

transforming the digital compensation filter output into a pulse width modulated (PWM) signal, as represented by pulse width modulator 130; and amplifying the PWM signal in an amplifier 132, which is shown incorporated in system controller 26 but may be supplied separately.

System controller 26 is programmed such that first flap edge sensor 70 for upstream sensing of the envelopes and encoder 104 for the actual position of nozzle 50 are sampled at the appropriate time, and such that amplified PWM signals are output to motor 66 to pre-position motor 66 at the appropriate time, as described above.

A microcomputer implemented control loop for controlling a d.c. motor is described in U.S. Pat. No. 4,630,210 of Salazar et al., assigned to the assignee of this application. The '210 Patent discloses algorithms by which a digital compensation control (or a lead/lag filter) is implemented, and algorithms by means of which a d.c. motor is controlled according to a predetermined velocity curve (motion profile). The disclosure of the '210 Patent is incorporated herein by reference. Those of skill in the art by means of the disclosure herein and in the '210 Patent may construct programs implementing the digital compensation control or lead-lag filter 128, the pulse width modulator 130 and motion profile 122. Encoder 104 may be a conventional low resolution encoder, and decoding of the signals therefrom in system controller 26 (decoder 120) (or externally thereof) may be accomplished conventionally by, for example, counting circuitry.

Referring to FIG. 5, first flap edge sensor 70 comprises a plurality of individual emitters 140 extending in a row and a corresponding plurality of individual sensors 142, e.g. 16 extending in a row about 4 inches long. This gives a course sensing resolution of about 0.25 inches and enables flaps as high as about 4 inches to be sensed. The individual emitters 140 and sensors 142 may be positioned on opposite sides of an envelope flap moved therepast, or on the same side depending on whether sensors 142 detect emissions directly from emitters 140 or emissions reflected from flap 42; and the individual emitters 140 and sensors 142 are appropriately positioned with respect to each other depending on whether direct or reflected emissions are to be detected. The rows of emitters 140 and sensors 142 extend parallel to the direction of movement of nozzle 50, and are inclined with respect to the top deck 34 at substantially the same angle as guide rods 58, 59. In the presently preferred embodiment, emitters 140 are light emitting diodes (LEDs), and sensors 142 are photo-transistors. Emitters 140 may be strobed by system controller 26 represented by line 143.

First positioning servo loop 67 upon sensing an envelope flap at first location 71 by first flap edge sensor 70 prepositions nozzle 50 to a coarse location, as follows.

When envelope flap 42 is first detected by first sensor 70, first, lower bandwidth, servo loop 67 pre-positions nozzle 50 to a coarse flap position corresponding to the location of the flap edge relative to sensor 70 when sensor 70 first detects the flap edge. That coarse position of nozzle 50 is then maintained until the same envelope flap is first detected by second sensor 64. Second, higher bandwidth servo loop 68 then assumes control of nozzle 50 until second sensor 64 no longer detects the envelope flap. First, lower bandwidth servo loop 67 then again takes control of nozzle 50 and maintains it at same nominal or default position until first sensor 70 detects another envelope flap.

As discussed above, second flap edge sensor 64 is positioned at second location 72 very close to nozzle 50. Second sensor 64 may be implemented as described above for first sensor 70, i.e., comprised of a plurality of individual emitters 140 and sensors 142 arranged in respective rows, and may be strobed by system controller 26 as represented by line 144. Second sensor 64 may comprise a member of individual sensors positioned closely adjacent each other extending in a row about 1 inch to about 1.5 inches long. The individual sensors are spaced to give a sensing resolution of about 0.085 inch. Second flap edge sensor 64 is attached to nozzle 50 to move therewith, and positioned such that a central emitter 150 and sensor 151 thereof are aligned with tip edge 154 of nozzle 50. Thus, tip edge 154 of nozzle 50 is defined as the reference referred to above, and the position of the edge of an envelope flap relative thereto is sensed by second flap edge sensor 64 and decoded by controller 70. Second flap edge sensor 64 is thus configured as a linear array and the position on the linear array of the edge of an envelope flap relative to the central or reference sensor element 151 is encoded in the signal output by second sensor 64. Second servo loop 68 therefore does not employ an actual position encoder for nozzle 50, and the position of the edge of the envelope flap relative to the tip 154 of nozzle 50 is instantly encoded each time the output signal from second sensor 64 is sampled by controller 69. The sampling rate of controller 69 is not tied to system controller 26 and therefore may be made higher than that of system controller 26, as discussed above.

Controller 69 provides a positive or negative motor drive signal to motor 66 depending upon which side of reference sensor 151 an envelope flap lies. Controller 69 may include a decoder that receives the signal output by second sensor 64 and decodes it to provide the positive or negative output signal. Such a decoder may be PLA based and may be routinely constructed by those of skill in the art to accomplish the foregoing functions. The positive or negative output motor drive signals from controller 69 are supplied to amplifier 162 which supplies them to motor 66 to drive it in one direction or the other to close loop 68.

The output of second flap edge sensor 64 is also coupled to system controller 26 as a start/stop signal via line 166 for enabling second loop 68 and disabling first loop 67. System controller 26, in response to second flap edge sensor 64 sensing an envelope flap, as decoded by controller 69 and supplied to system controller 26 via line 166, internally disables first servo loop 68 (as represented by start/stop function 165), and issues a start signal on line 167 to amplifier 162 to enable second servo loop 68. Thus, motor 66 is controlled by first servo loop 67 except when second flap edge sensor 64 senses an envelope flap 42, at which time system controller 26 passes control of motor 66 to second servo loop 68.

Figure 6:
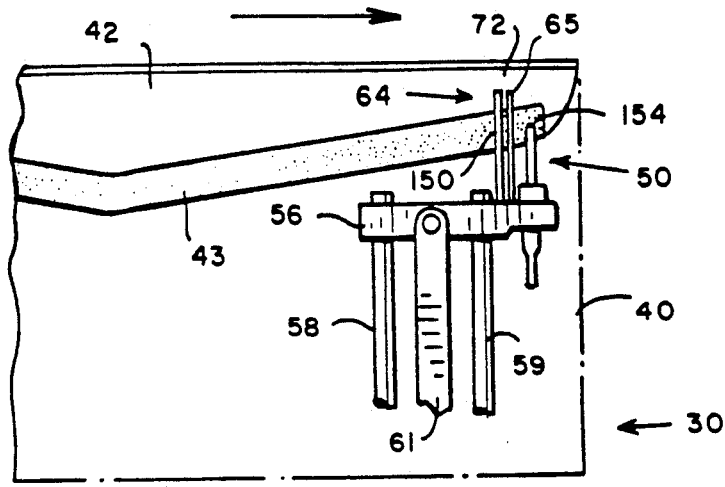
FIGS. 6, 7 and 8 are schematic views illustrating a moistening sequence.
Figure 7:
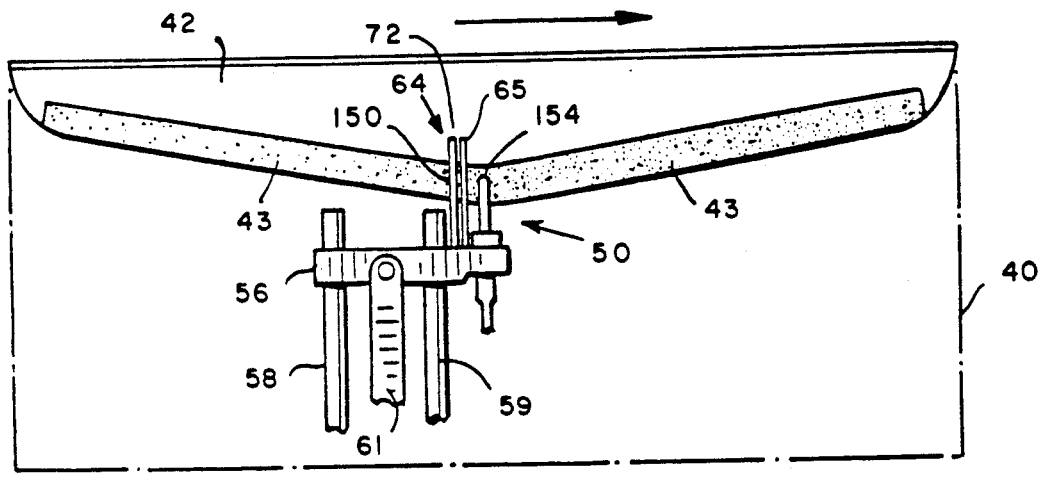
Figure 8:
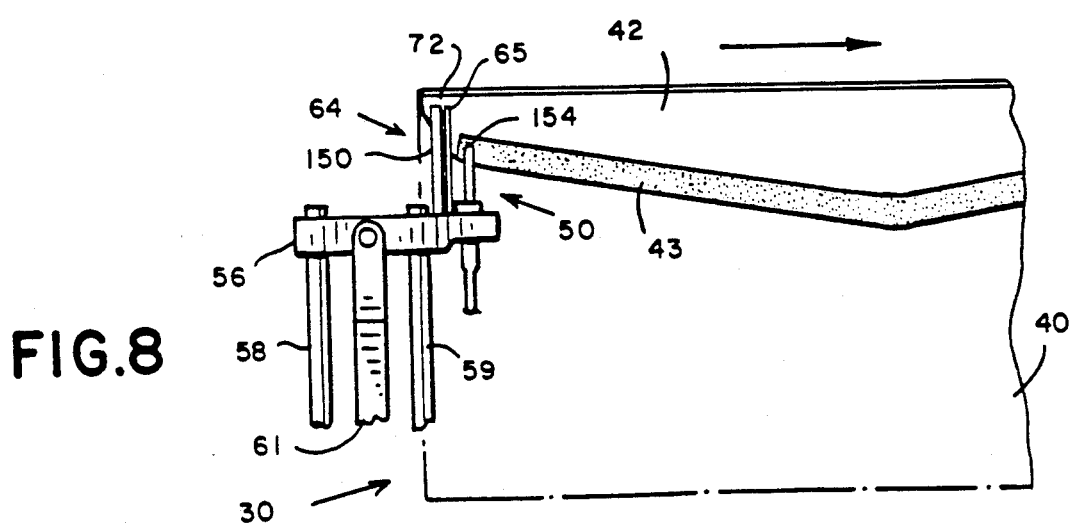

Referring to FIGS. 6-8, after first flap edge sensor 70 detects flap 42a of envelope 30a at first location 71, nozzle 50 is pre-positioned by first servo system 67 to be adjacent the leading edge of flap 42a, as depicted in FIG. 6. Then nozzle 50 is moved by second servo system 68 to track the edge of flap 42a, as depicted in FIGS. 7 and 8. Nozzle 50 is then pre-positioned for the next envelope to be moistened if one is approaching, otherwise, it is moved to its default location. When moistening consecutive, identical envelopes, the final tracking position of nozzle 50 (FIG. 8) is at or close to the pre-position for the next envelope (FIG. 6).

Moistening pump 54 is activated a pre-selected time after first sensor 70 first detects an envelope flap edge. A time delay after detection of an envelope flap by sensor 70 to activate pump 54 is required since there is a time lag between the signal provided to pump 54 to activate it and actual spraying. Depending upon system and component parameters, such a time lag may be too long if triggered by second sensor 64 rather than by first sensor 70. Pump activation is terminated a pre-selected time after first sensor 70 no longer detects the envelope flap. The pre-selected times or delays for activating and deactivating pump 54 depend upon envelope speed and the time lag between the pump activation signal and actual spraying. System controller 26 provides the activation and deactivation signals in accordance with those parameters. Since first sensor 70 is only about 3 inches to about 3.5 inches from nozzle 50, spray control may be quite accurate.

According to the invention disclosed herein, it is not necessary to determine the actual speed of the envelopes as they move towards nozzle 50, and to then correlate envelope speed, flap edge profile and distance between the sensing location and the nozzle. This greatly simplifies the design of the moistener 16 and increases the reliability of high-speed envelope moistening and sealing.

Certain changes and modifications of the embodiments of the invention herein disclosed will be readily apparent to those of skill in the art. Moreover, uses of the invention other than in mailing machines and other than for moistening envelope flaps will also be readily apparent to those of skill in the art. It is the applicant's intention to cover by the claims all such uses and all those changes and modifications which could be made to the embodiments to the invention herein chosen for the purposes of disclosure which do not depart from the spirit and scope of the invention.

What is claimed is:

1. A method for positioning a liquid outlet of a liquid applicator for causing a liquid to be discharged from said liquid applicator whereby said liquid is deposited on a flap of an envelope being moved to and past said liquid outlet at a speed of at least about 65 inches per second a given path with said flap extending from said envelope in an opened configuration thereof, said method comprising:

sensing the location of the edge of said flap within about 0.2 inch of said liquid outlet upstream thereof a plurality of times as said flap moves to and past said liquid outlet; and moving said liquid outlet in accordance with said sensing to track said flap while causing said liquid to be discharged from said liquid applicator and deposited onto said flap.

2. A method for positioning a liquid outlet of a liquid applicator for causing a liquid to be discharged from said liquid applicator whereby said liquid is deposited on a flap of an envelope being moved to and past said liquid outlet along a given path with said flap extending from said envelope in an opened configuration thereof, said method comprising:

attaching sensing means to said liquid outlet on an upstream side thereof relative to said path so that said sensing means and said outlet may be moved together; and sensing an edge of said flap relative to a reference of said sensing means which is fixed with respect to said sensing means; and moving said liquid applicator outlet to track said flap edge in accordance with said sensing while causing said liquid to be discharged from said liquid applicator and deposited onto said flap.

3. A method for positioning a liquid outlet of a liquid applicator for causing a liquid to be discharged from said liquid applicator whereby said liquid is deposited on a flap of an envelope being moved along a given path with said flap extending from said envelope in an opened configuration thereof, said method comprising:

sensing an edge of said flap at a first location of said path upstream of said outlet;

moving said liquid applicator outlet to a first position in accordance with said sensing of said flap edge at said first location;

sensing said flap edge at a second location which is adjacent said liquid outlet upstream thereof and downstream of said first location relative to said path; and moving said liquid outlet from said first position to maintain said liquid outlet adjacent said edge flap in accordance with said sensing of said flap edge at said second location while causing said liquid to be discharge from said liquid applicator and deposited onto said flap.

4. The method of claim 3 including:

attaching said sensing means to said liquid outlet on an upstream side thereof relative to said path so that said sensing means and said outlet may be moved together; and said sensing of said flap at said second location comprises sensing an edge of said flap relative to a reference of said sensing means which is fixed with respect to said sensing means while causing said liquid to be discharged from said liquid applicator and deposited onto said flap.

* * * * *